US010941871B2

(12) United States Patent
Yu et al.

(10) Patent No.: US 10,941,871 B2
(45) Date of Patent: Mar. 9, 2021

(54) FLOW CONTROL APPARATUS

(71) Applicant: Hangzhou Sanhua Research Institute Co., Ltd., Zhejiang (CN)

(72) Inventors: Yumin Yu, Zhejiang (CN); Huayuan Jiang, Zhejiang (CN); Zhi Wu, Zhejiang (CN); Yaoyao Zhang, Zhejiang (CN); Hongmin Lu, Zhejiang (CN)

(73) Assignee: Hangzhou Sanhua Research Institute Co., Ltd., Zhejiang (CN)

(*) Notice: Subject to any disclaimer, the term of this patent is extended or adjusted under 35 U.S.C. 154(b) by 55 days.

(21) Appl. No.: 16/316,605

(22) PCT Filed: Jun. 21, 2017

(86) PCT No.: PCT/CN2017/089290
§ 371 (c)(1),
(2) Date: Jan. 9, 2019

(87) PCT Pub. No.: WO2018/010525
PCT Pub. Date: Jan. 18, 2018

(65) Prior Publication Data
US 2019/0309859 A1    Oct. 10, 2019

(30) Foreign Application Priority Data

Jul. 12, 2016 (CN) .......................... 201610554086.1
Jul. 12, 2016 (CN) .......................... 201610556458.4

(51) Int. Cl.
*F16K 11/074* (2006.01)
*F16K 3/314* (2006.01)
(Continued)

(52) U.S. Cl.
CPC ............ *F16K 11/074* (2013.01); *F16K 3/314* (2013.01); *F16K 27/04* (2013.01); *F16K 31/44* (2013.01)

(58) Field of Classification Search
CPC ........ F16K 11/074; F16K 3/314; F16K 27/04; F16K 31/44; F16K 3/08; F16K 27/048; F16K 27/045; Y10T 137/86533
(Continued)

(56) References Cited

U.S. PATENT DOCUMENTS 6,626,203 B1    9/2003    Schneider
2009/0266432 A1   10/2009    Chen
(Continued)

FOREIGN PATENT DOCUMENTS

CN    200955608 Y    10/2007
CN    201195881 Y    2/2009
(Continued)

OTHER PUBLICATIONS

Third Party Observation for European Application No. 17826863.7, dated Oct. 9, 2019.
(Continued)

*Primary Examiner* — Michael R Reid
(74) *Attorney, Agent, or Firm* — Wolf, Greenfield & Sacks, P.C.

(57) ABSTRACT

A flow control apparatus for a heat exchange system of a vehicle, including a housing, a valve cartridge assembly, and a control part. A first protrusion is provided on the housing; correspondingly, a second protrusion is provided on a shell of the control part; the first protrusion and the second protrusion are assembled and engaged; a first valve plate is sealed from a second valve plate, so that the seal performance of a product can be improved.

15 Claims, 8 Drawing Sheets

(51) Int. Cl.
*F16K 27/04* (2006.01)
*F16K 31/44* (2006.01)

(58) Field of Classification Search
USPC .................................................. 137/625.15
See application file for complete search history.

(56) References Cited

U.S. PATENT DOCUMENTS

| | | |
|---|---|---|
| 2014/0238517 A1 | 8/2014 | Chen |
| 2014/0345730 A1 | 11/2014 | Chang |
| 2015/0233476 A1 | 8/2015 | Bachofer |
| 2017/0089474 A1 | 3/2017 | Zhan et al. |
| 2019/0301619 A1 | 10/2019 | Wu et al. |

FOREIGN PATENT DOCUMENTS

| | | |
|---|---|---|
| CN | 201396482 Y | 2/2010 |
| CN | 202612714 U | 12/2012 |
| CN | 204784856 U | 11/2015 |
| CN | 205064928 U | 3/2016 |
| CN | 205207770 U | 5/2016 |
| DE | 20 2012 012 981 U1 | 6/2014 |
| EP | 3 470 713 A1 | 4/2019 |
| GB | 2527339 A | 12/2015 |
| JP | S57-056271 U | 4/1982 |
| JP | 2011-149552 A | 8/2011 |
| WO | WO 02/059515 A1 | 8/2002 |
| WO | WO-2014072376 A1 * | 5/2014 ........... F16K 31/043 |

OTHER PUBLICATIONS

First Office Action for Chinese Application No. 201610554086.1, dated Dec. 28, 2018.

International Search Report and Written Opinion for International Application No. PCT/CN2017/089290, dated Sep. 22, 2017.

Office Action for Japanese Application No. 2019-501633, dated Dec. 3, 2019.

* cited by examiner

FLOW CONTROL APPARATUS

This application is a National Stage filing under 35 U.S.C. § 371 of International Application Serial No. PCT/CN2017/089290, filed on Jun. 21, 2017, which claims priority to Chinese patent application No. 201610554086.1 titled "FLOW RATE CONTROL DEVICE", and Chinese patent application No. 201610556458.4 titled "FLOW RATE CONTROL DEVICE" each filed with the Chinese State Intellectual Property Office on Jul. 12, 2016. The entire contents of these applications are incorporated herein by reference in their entireties.

FIELD

The present application relates to flow rate control devices in the field of heat exchange.

BACKGROUND

A thermal management system for an electric vehicle includes a cooling liquid circulation system, and generally includes at least a thermal converter, a drive motor, a water storage kettle, an electric water pump, a flow path switching element, a heat-radiating tank high-temperature zone and a high-voltage positive temperature coefficient (PTC) device. The flow path switching element is connected with a pipeline in circulation, and may be used for switching a flow direction of the cooling liquid. For example, a PTC heating device is added in a hybrid electric vehicle, so as to make up for the shortage of insufficient residual heat, and it may be required to switch the cooling liquid to flow to the PTC heating device, and in the process of switching the PTC heating device, it is also required to switch the flow direction of the cooling liquid.

At present, the flow path switching element for the cooling liquid has a very wide range of applications in hybrid and pure electric vehicle industries, for example, a motor-driven piston valve. The piston valve has a valve core assembly mounted in its valve body, and the valve core assembly is connected to a speed reduction gear mechanism by a valve core shaft, and the speed reduction gear mechanism is driven by a motor to drive the valve core assembly to perform reciprocal linear movement to change the position sealed by the valve core assembly. However, a sealing ring used in the piston valve is made of a rubber material and is apt to be excessively deformed or damaged when being pressed by the movable valve core. Therefore, after long-term use, the sealing performance of the flow path of the cooling liquid is extremely apt to be degraded, and internal leakage of the piston valve may be caused. The piston can continue to be used only after new sealing rings are replaced, which may adversely affect the use.

SUMMARY

An object of the present application is to provide a flow rate control device capable of improving internal sealing performance.

To achieve the above object, the flow rate control device according to the present application adopts the following technical solution. A flow rate control device includes a housing, a valve core assembly and a control component. The housing has a mounting chamber, and the valve core assembly is at least partially accommodated in the mounting chamber. The valve core assembly includes a first valve plate, a second valve plate and a transmission part. The housing has a position-limiting protrusion and an accommodating portion at a bottom side of the mounting chamber. The first valve plate is at least partially located at the accommodating portion, the position-limiting protrusion is capable of limiting the position of the first valve plate in a circumferential direction, and a lower surface of the second valve plate is arranged at least partially opposite to the position-limiting protrusion, and the lower surface of the second valve plate is in surface contact with an upper surface of the first valve plate in a sealed manner. The housing has at least one flow hole at the bottom side of the mounting chamber. The first valve plate has at least one flow valve port corresponding to and in communication with the flow hole, the second valve plate is relatively fixedly connected to the transmission part, and driven by the transmission part, the second valve plate opens or closes the flow valve port of the first valve plate and/or regulates an opening degree of the flow valve port. The transmission part includes a first transmission portion and a second transmission portion, and in a vertical direction perpendicular to the first valve plate, the first transmission portion and the second transmission portion are located at two opposite ends of the transmission part. The first transmission portion is assembled with an upper side of the second valve plate. The housing has a through hole corresponding to the second transmission portion, and the second transmission portion passes through the through hole and extends out of the housing. The housing is provided with a first protrusion on an outer side thereof, and a shell of the control component is provided with a second protrusion, and the first protrusion and the second protrusion are assembled and fitted with each other.

Compared with the conventional technology, the first valve plate and the second valve plate are arranged to be sealed against each other according to the present application, thereby can improve the internal sealing performance of the flow rate control device.

Another object of the present application is to provide another flow rate control device that can improve the internal sealing performance.

To achieve the above object, the flow rate control device according to the present application adopts the following technical solution. A flow rate control device, includes a housing and a valve core assembly. The housing has a mounting chamber, and the valve core assembly is at least partially accommodated in the mounting chamber. The valve core assembly includes a first valve plate, a second valve plate and a transmission part, the housing has a position-limiting protrusion and an accommodating portion at a bottom side of the mounting chamber. The first valve plate is at least partially located at the accommodating portion, the position-limiting protrusion is capable of limiting the position of the first valve plate in a circumferential direction. A lower surface of the second valve plate is arranged at least partially opposite to the position-limiting protrusion, and the lower surface of the second valve plate is in surface contact with an upper surface of the first valve plate in a sealed manner. The housing has at least one flow hole at the bottom side of the mounting chamber. The first valve plate has at least one flow valve port corresponding to and in communication with the flow hole, the second valve plate is relatively fixedly connected to the transmission part. Driven by the transmission part, the second valve plate opens or closes the flow valve port of the first valve plate and/or regulates an opening degree of the flow valve port. The transmission part includes a first transmission portion and a second transmission portion, and in a vertical direction perpendicular to the first valve plate, the first transmission portion and the second transmission portion are located at opposite ends of the transmission part. The first transmission portion is assembled and fixed to an upper side of the second valve plate, the housing has a through hole corresponding to the second transmission portion, and the second transmission portion passes through the through hole and extends out of the housing. The transmission part further includes a pivoting portion, and the pivoting portion is integrally formed with the second transmission portion. The pivoting portion is pivotally fitted with the housing, and the housing is correspondingly convexly provided with a pivotally fitting portion. The pivotally fitting portion is configured to protrude from an inner side of the housing towards a side where the pivoting portion is located, and the pivotally fitting portion has a pivoting recess for accommodating the pivoting portion. The pivoting recess is in communication with the through hole, and an inner circumferential side of the pivotally fitting portion is pivotally fitted with an outer circumferential side of the pivoting portion.

Compared with the conventional technology, the first valve plate and the second valve plate are arranged to be sealed against each other according to the present application, thereby can improve the internal sealing performance of the flow rate control device.

DETAILED DESCRIPTION OF EMBODIMENTS

Figure 1:
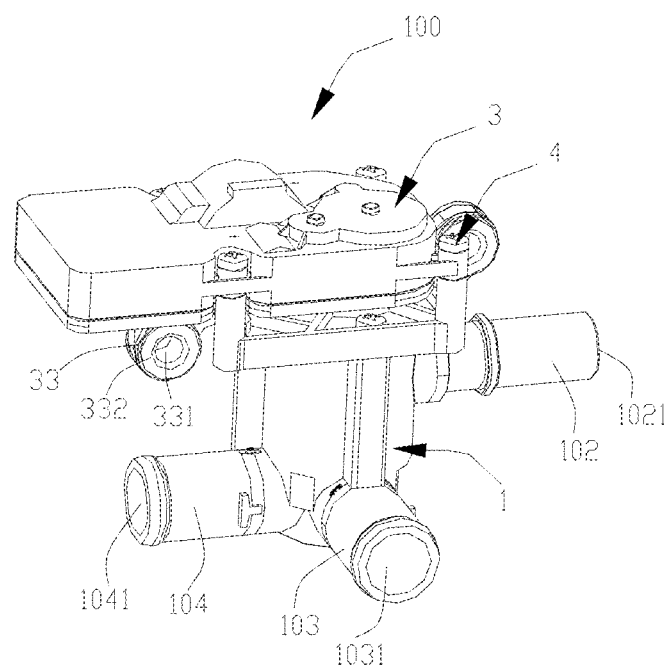
FIG. 1 is a schematic perspective view of a flow rate control device according to a first embodiment in an assembled state.

Reference is made to FIGS. 1 to 5, the flow rate control device 100 may be applied to a heat exchange system, such as a vehicle air conditioning system or a home air conditioning system. Specifically, the flowing medium flowing in the flow rate control device may be water, a mixture liquid of water and other liquids, or other cooling liquids having a capacity of heat transmission. The flow rate control device controls the distribution of the flowing medium to allow the flowing medium to exchange heat with other working mediums of the heat exchange system, and then regulates the distribution to the medium outlet flow rate of the flow rate control device to control the flowing medium in the flow path of the heat exchange system and thereby can improve and optimize the performance in controlling the flow path of the heat exchange system.

The flow rate control device 100 is provided in a pipeline of a new energy automotive air conditioner system, can be configured to achieve switching between a heating and ventilating flow path, a battery cooling flow path and a battery heating system flow path. Through the arrangement of the multi-way control structure of the flow rate control device, the flow rate control device distributes in proportion the working medium coming from the same inlet to different outlets. The flow rate control device can be located in two or more heat exchange system circuits, and can cooperate with the heat exchange system to perform flow path switching, and can realize proportional distribution of flow rates of the working medium flowing in different flow paths of the heat exchange system.

The flow rate control device includes a housing 1, a valve core assembly 2 and a control component 3. The housing includes a distribution main body 11 and a cover body 12. The distribution main body has a mounting chamber 101, and an upper side of the mounting chamber 101 has a mounting opening, specifically, the mounting opening can be defined as an upper port of the distribution main body. The valve core assembly 2 is disposed into the mounting chamber 101 from the mounting opening, and is at least partially accommodated in the mounting chamber. Further, the distribution main body 11 is assembled with the cover body 12. Specifically, the distribution main body 11 and the cover body 12 are each provided with a screw mounting hole, and can be assembled together by a screw element 4 so as to be relatively fixedly arranged. The housing 1 and the control component 3 are also assembled together by threaded connection.

Figure 6:
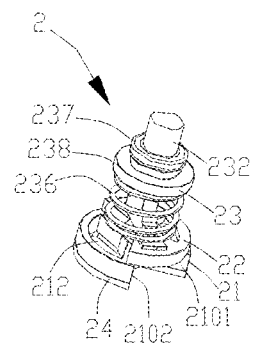
FIG. 6 is a schematic perspective view showing the valve body component of the flow rate control device in FIG. 2 in an assembled state.
Figure 7:
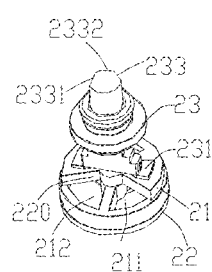
FIG. 7 is a schematic perspective view of the assembled valve body component in FIG. 6 viewed from another angle.
Figure 8:
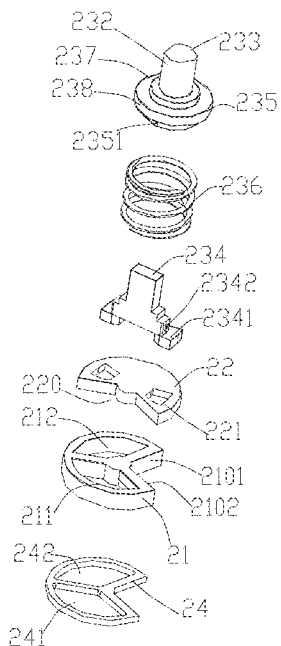
FIG. 8 is a perspective exploded view of the valve body component in FIG. 6.
Figure 9:
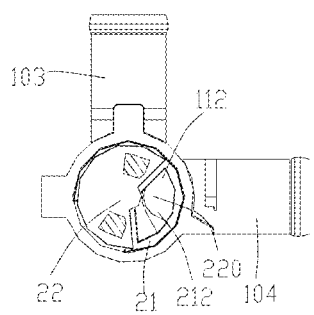
FIG. 9 is a perspective top view showing the distribution main body in FIG. 4 assembled with a first valve plate and a second valve plate.
Figure 10:
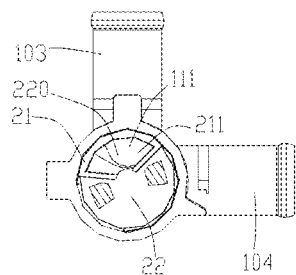
FIG. 10 is a perspective top view showing the assembled distribution main body and the first valve plate and the second valve plate in FIG. 9 viewed from another angle.

The housing 1 has at least one inlet and at least one outlet. In this embodiment, the housing 1 has a first pipeline, a second pipeline and a third pipeline. The first pipeline is an inlet pipeline 102. The second pipeline is a first outlet pipeline 103, and the third pipeline is a second outlet pipeline 104, such that the housing 1 has an inlet 1021, a first outlet 1031 and a second outlet 1041, thus forming a three way structure including one inlet and two outlets. Specifically, the distribution main body 11 cooperates with the cover body 12 to form the mounting chamber 101. The inlet, the first outlet and the second outlet can be fitted with connecting pipelines in the heat exchange system circuits where they are located. Specifically, the inlet pipeline 102, the first outlet pipeline 103 and the second outlet pipeline 104 of the housing and the distribution main body may be an integrally formed structure. With reference to FIG. 6 to FIG. 8, the valve core assembly 2 is at least partially accommodated in the mounting chamber 101, the valve core assembly 2 includes a first valve plate 21, a second valve plate 22 and a transmission part 23. The housing 1 has a position-limiting protrusion 13 and an accommodating portion 1011 located on the bottom side of the mounting chamber. Specifically, each of the position-limiting protrusion and the accommodating portion 1011 has a fan-shaped outer contour. The accommodating portion and the position-limiting protrusion are complementarily arranged in the housing. The "complementary arrangement" is defined herein in view of the bottom region of the housing, the accommodating portion occupies one part of the bottom region, and the position-limiting protrusion occupies the other part of the bottom region, and particularly in a top view, the accommodating portion and the position-limiting protrusion are complementarily arranged within the range of the bottom region in the housing. The first valve plate 21 is at least partially located in the accommodating portion 1011, and the position-limiting protrusion 13 can limit the position of the first valve plate in a circumferential direction such that the first valve plate 21 is relatively fixedly arranged relative to the housing. The definition "relatively fixed arrangement" here means that the first valve plate can move within an allowable range. The first valve plate 21 is located in the accommodating portion 1011 so as to be arranged also substantially complementary to the position-limiting protrusion 13. Corresponding to the position-limiting protrusion, the first valve plate 21 is configured in a fan shape substantially, such configuration can reduce the volume of the first valve plate, reduce the material cost, and a lower surface of the first valve plate is in direct contact with the housing in a sealed manner or a sealing member is additionally provided for sealing the first valve plate against the housing. An upper surface of the first valve plate is in contact with the second valve plate, the lower surface of the first valve plate is arranged opposite to the upper surface thereof. A lower surface of the second valve plate is in contact with the first valve plate, and an upper surface of the second valve plate is arranged opposite to the lower surface of the second valve plate. For the convenience of description, the direction perpendicular to the first valve plate 21 and the second valve plate is defined here as a vertical direction. Specifically, the vertical direction is perpendicular to the planes where the first valve plate and the second valve plate are located, that is, the vertical direction is just a central axis direction about which the second valve plate rotates, and may also be understood as an axial direction of the mounting chamber or an axial direction of the transmission part. The lower surface of the first valve plate 21 is lower than an upper surface 131 of the position-limiting protrusion 13. The upper surface of the first valve plate is higher than or flush with the upper surface of the position-limiting protrusion 13, and the lower surface of the second valve plate is arranged at least partially opposite to the upper surface of the position-limiting protrusion. In the vertical direction, a clearance is presented between the lower surface of the second valve plate and the upper surface of the position-limiting protrusion, and the clearance is not larger than the thickness dimension of the first valve plate. Specifically, the thickness dimension of the first valve plate ranges from 3 mm to 9 mm, such as 4 mm, 5 mm, 6 mm, 7 mm. If the first valve plate is too thin, it will be not easy to manufacture and has a poor structural strength. If the first valve plate is too thick, it will relatively increase the overall height dimension of the product, which is not conducive to miniaturization and will relatively increase raw material costs.

A first block portion 132 and a second block portion 133 are respectively formed on two sides of the position-limiting protrusion 13. The first block portion and the second block portion are formed on side edge regions on two sides of the position-limiting protrusion. The side edge regions are arranged to intersect with the upper surface 131 of the position-limiting protrusion, and the first block portion and/or the second block portion are configured to be arranged opposite to side edges of the first valve plate. The first valve plate 21 has a first abutment portion 2101 and a second abutment portion 2102. For the first valve plate, the first valve plate has a main body portion 210 with a fan-shaped profile, the main body portion includes an arc-shaped portion. The arc-shaped portion and the first abutment portion and the second abutment portion are configured in a fan shape. The first abutment portion 2101 is arranged opposite to the first block portion 132, and the second abutment portion 2102 is arranged opposite to the second block portion 133, such that the first block portion and the second block portion can limit the position of the first valve plate in a circumferential direction. Specifically, a clearance is allowed to be presented between the first valve plate 21 and the position-limiting protrusion, that is, the first valve plate 21 and the housing are in a clearance fit. A clearance smaller than 2 mm is presented between the first abutment portion 2101 and the first block portion 132 of the position-limiting protrusion, and/or, a clearance smaller than 2 mm is presented between the second abutment portion 2102 and the second block portion 133. The first valve plate 21 and the position-limiting protrusion 13 of the housing are embodied to be in the above clearance fit at the two sides, such that the first valve plate 21 is easy to be mounted in the housing without adversely affecting the sealing performance between first valve plate and the second valve plate.

The lower surface of the second valve plate 22 is arranged at least partially opposite to the upper surface 131 of the position-limiting protrusion, and in the vertical direction, the lower surface of the second valve plate 22 and the upper surface 131 of the position-limiting protrusion are arranged at least partially opposite to each other. A clearance is presented between the lower surface of the second valve plate and the upper surface 131 of the position-limiting protrusion, and the clearance is smaller than 0.8 mm. With such an arrangement, the friction resistance subjected by the second valve plate during rotation relative to the first valve plate can be reduced, thus ensuring the movability of the second valve plate. In addition, the upper surface 131 of the position-limiting protrusion 13 forms a substantially fan-shaped position-limiting surface. When the first valve plate 21 is subjected to a downward pressure exerted by the second valve plate or a downward pressure exerted by the flowing medium, the upper surface of the position-limiting protrusion can provide position-limiting when necessary, which is favorable for improving the stability of movements of the second valve plate. The lower surface of the second valve plate 22 rotates reciprocally along the upper surface of the first valve plate, that is, the second valve plate is a movable valve plate, and with respect to the second valve plate, the first valve plate serves as a relatively fixed valve plate. The second valve plate performs a rotating movement along the upper surface of the first valve plate. This movement mode of reciprocating rotation can reduce the space required for the movement stroke while ensuring the opening and closing of the flow valve port compared with a linear reciprocating movement mode, which is advantageous to product volume reduction. The lower surface of the second valve plate 22 has a roughness smaller than or equal to the roughness of the upper surface of the second valve plate. The upper surface of the first valve plate 21 has a roughness smaller than or equal to the roughness of the lower surface of the first valve plate. The upper surface of the first valve plate and the lower surface of the second valve plate serve as rubbing contact surface, and the roughness requirement is relatively high. After multiple times of design and repeated tests, the surface roughness of the upper surface of the first valve plate is larger than 0.03 μm and smaller than 0.5 μm, and/or the surface roughness of the lower surface of the second valve plate is larger than 0.03 μm and smaller than 0.5 μm, such as a surface roughness of 0.03 μm, 0.04 μm, 0.05 μm, 0.06 μm, 0.07 μm, 0.08 μm, 0.09 μm, 0.1 μm, 0.2 μm, 0.3 μm, 0.4 μm, 0.45 μm, 0.485 μm, or any other values within the above range, thus may ensure the sealing performance between the first valve plate and the second valve plate, for example, may internally seal the liquid flowing medium, to prevent internal leakage from adversely affecting the performance in controlling the flowing medium. In contrast, the lower surface of the first valve plate and the upper surface of the second valve plate serve as non-rubbing surfaces, and the requirements upon roughness is low, so as to reduce manufacturing costs.

The first valve plate and the second valve plate are ceramic valve plates or metal valve plates, such that each valve plate has a high wear resistance, a high melting point, a high hardness, and is not apt to be oxidized at high temperatures, for example, the ceramic valve plates, and has a good anti-corrosion capability against acid, alkali and salt. Therefore, when used repeatedly at different temperatures for a long time, the ceramic valve plate or the metal valve plate can maintain a good sealing effect, and are not apt to occur an aging phenomenon compared with a rubber material, thereby can guarantee the performance of the flow rate control device. Further, the first valve plate and the second valve plate are respectively used as a lower valve plate and an upper valve plate, and are each configured in a fan shape, and the contact area of their opposite contact surfaces is small, which can reduce the friction therebetween and reduce the requirements on torque of the motor, prevent the flow rate control device from being unable to move due to the excessive friction and also facilitate the reduction of costs and overall weight of the product.

The distribution main body 11 of the housing 1 has at least one flow hole located at a bottom side of the mounting chamber, the at least one flow hole is in communication with the at least one outlet. The first valve plate 21 has at least one flow valve port corresponding to and in communication with the flow hole of the housing. The number of the flow valve port is equal to or not equal to the number of the flow hole. For example, in the case that the first valve plate 21 is provided with one flow valve port, the flow hole of the housing may be one or two, or for example, in the case that the first valve plate 21 is provided with two flow valve ports, the flow hole of the housing may be one or two, and can be formed and manufactured depending on requirements. In application, the number of the flow valve port and the number of the flow hole may also be increased or decreased depending on the requirements of the system pipelines. The second valve plate 22 includes a fan-shaped opening 220. When the fan-shaped opening is partially aligned with the flow valve port portion of the first valve plate and put the valve into conduction, one of the outlets can be opened. The second valve plate 22 is relatively fixedly connected to the transmission part 23. The control component 3 of the flow rate control device can provide a driving force. The driving force drives the transmission part 23 to move, and the transmission part 23 drives the second valve plate 22. An upper end of the transmission part 23 is mechanically connected to the control component, and the upper end is sealed against the housing 1. The upper surface of the first valve plate is in contact with the lower surface of the second valve plate. Driven by the transmission part 23, the second valve plate 22 opens or closes the flow valve port of the first valve plate, and/or regulates the opening degree of the flow valve port. In addition, in the vertical direction, the lower surface of the second valve plate 22 is arranged opposite to the upper surface of the position-limiting protrusion 13, and the lower surface of the second valve plate 22 is in contact with the upper surface of the first valve plate, such that the working medium of the flow control valve flows through the flow valve port to prevent the working medium from leaking via the clearance between the first valve plate and the second valve plate.

Referring to FIGS. 4 to 10, the flow hole of the housing includes a first flow hole 111 and a second flow hole 112 at the bottom side of the mounting chamber. The first outlet of the housing is in communication with the first flow hole, and the second outlet of the housing is in communication with the second flow hole. The flow valve port of the first valve plate 21 includes a first flow port 211 corresponding to and in communication with the first flow hole and a second flow port 212 corresponding to and in communication with the second flow hole. Specifically, the first valve plate has a partition 214. The partition is integrally formed on an inner side of the fan-shaped main body portion. The first flow port 211 and the second flow port 212 are formed at two sides of the partition 214, thereby the flow rate control device has a flow channel via which the inlet pipeline 102 is in communication with at least one of the first outlet pipeline and the second outlet pipeline. Driven by the transmission part 23, the second valve plate 22 can open the first flow port 211 and/or the second flow port 212 of the first valve plate 21, such that the fan-shaped opening 220 of the second valve plate is in communication with the first flow port 211 and/or the second flow port 212. By opening the first flow port 211, the inlet pipeline and the first outlet pipeline of the housing are enabled to be in communication. By opening the second flow port 212, the inlet pipeline and the second outlet pipeline are enabled to be in communication. The transmission part 23 is capable of controlling the second valve plate to make a rotating movement, thereby regulating the proportions of flow rates distributed to the first outlet pipeline and the second outlet pipeline from the inlet pipeline. Specifically, when the first flow port and the second flow port are both opened at the same time, if the opening degree of the first flow port 211 increases, the opening degree of the second flow port 212 decreases, or if the opening degree of the second flow port 212 increases, the opening degree of the first flow port 211 decreases.

Figure 2:
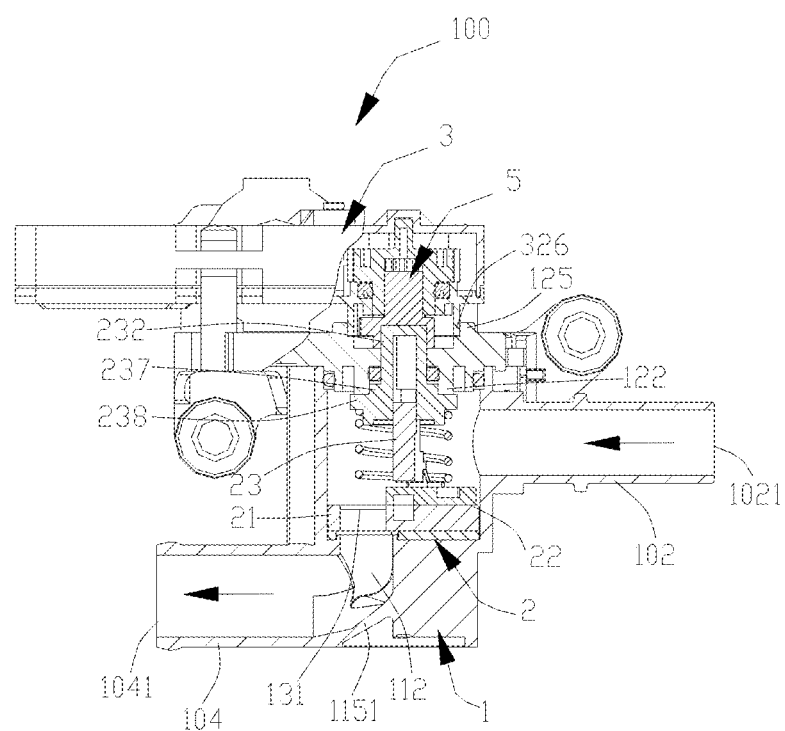
FIG. 2 is a perspective partially sectional view of the flow rate control device in FIG. 1, and schematically shows the relationship between a valve body component and a housing of the flow rate control device in assembling.

In addition, as shown in FIG. 2, the distribution main body 11 of the housing 1 is formed with a divider 113, a first distribution chamber 114 and a second distribution chamber 115. The divider 113 is configured to integrally extend from the bottom side of the housing, and is integrally formed with the position-limiting protrusion 13. The first distribution chamber 114 and the second distribution chamber 115 are respectively located at two sides of the divider 113. The first flow hole 111 of the housing is in communication with the first distribution chamber 114, and the second flow hole 112 is in communication with the second distribution chamber 115, such that the working medium can be distributed from the first flow hole and the second flow hole into the first distribution chamber and the second distribution chamber corresponding thereto respectively. Further, a bottom side of the first distribution chamber 114 is formed with a first flow guiding portion 1141. The first flow guiding portion has an arc-shaped connection surface connected to a side wall surface of the divider, and/or a bottom side of the second distribution chamber 115 is formed with a second flow guiding portion 1151. The second flow guiding portion has an arc-shaped connection surface connected to another side wall surface of the divider, which can guide the working medium to pass smoothly and reduce the fluid resistance as much as possible.

Specifically, the second valve plate 22 moves between a first position and a second position relative to the first valve plate. Thus, when the second valve plate 22 is in the first position, the second valve plate opens the first flow port 211 such that the first outlet pipeline 103 is conducted, and closes the second flow port 212 such that the second outlet pipeline 104 is cut off. When the second valve plate 22 is in the second position, the second valve plate opens the second flow port 212 such that the second outlet pipeline 104 is conducted, and closes the first flow port 211 such that the first outlet pipeline 103 is cut off. Further, during the movement of the second valve plate 22, when the second valve plate 22 moves to the first position, the first flow port 211 is opened to a maximum opening degree and the opening degree of the second flow port 212 is zero, in this case, the flow area of the first flow port reaches the maximum, and the flow area of the second flow port reaches the minimum. When the second valve plate 22 reaches a second position, the opening degree of the first flow port 211 is zero and the second flow port 212 is opened to a maximum opening degree, in this case, the flow area of the first flow port reaches the minimum, and the flow area of the second flow port reaches the maximum. When the second valve plate 22 moves to a position between the first position and the second position, both the first flow port 211 and the second flow port 212 are opened. The sum of the opening degree of the first flow port 211 and the opening degree of the second flow port 212 is equal to the maximum opening degree of the first flow port or the maximum opening degree of the second flow port, that is, the sum of the flow areas of the first flow port and the second flow port is equal to the maximum flow area of any one of the first flow port and the second flow port, such that the flow rate control device can realize the proportional distribution of the working medium. Moreover, the first valve plate and second valve plate are arranged to be sealed against each other, which can significantly improve the sealing performance of the product and prevent the leakage of the working medium from the clearance between the first valve plate and the second valve plate. The first flow hole 111 and the second flow hole 112 of the housing are each configured in a fan shape or a crescent shape or a kidney shape, and correspondingly, the first flow port 211 and the second flow port 212 are fan-shaped, crescent-shaped or kidney-shaped. As the flow areas of the first flow port and the second flow port of the second valve plate increase or decrease, the flow rate of the working medium gradually increases or decreases. Thus, in the process of closing or opening the flow valve port, the valve opening characteristics and the valve closing characteristics can be better maintained relatively consistent with each other. Thus, when the system is running, regulating the flow rate of the system may be performed more stably.

The flow rate control device further includes a sealing member 24 which has substantially an overall fan shape. The sealing member is located in the accommodating portion 1011, and the sealing member is arranged to correspond to the first valve plate 21. The sealing member and the first valve plate 21 are located at a region complementary to the position-limiting protrusion 13. Specifically, the sealing member and the first valve plate 21 are arranged in the accommodating portion 1011. The sealing member 24 is formed with a first through hole 241 and a second through hole 242. Each of the first through hole 241 and the second through hole 242 is arranged in a fan shape or a crescent shape or a kidney shape. The first through hole 241 is arranged to correspond to the first flow hole 111 of the housing, and the second through hole 242 is arranged to correspond to the second flow hole 112 of the housing. Alternatively, the first through hole 241 is arranged to correspond to the first flow port 211 of the first valve plate, and the second through hole 242 is arranged to correspond to the second flow port 212 of the first valve plate to facilitate the smooth passage of the working medium and reduce fluid resistance. The sealing member 24 abuts against the bottom wall of the housing 1 and the first valve plate 21 respectively. The sealing member 24 is in contact with the lower surface of the first valve plate 21 and is in contact with the housing, so as to perform sealing. In a vertical direction perpendicular to the first valve plate, the sealing member is sandwiched between the lower surface of the first valve plate and the housing. The housing has a positioning groove 1012 for accommodating the sealing member. The positioning groove is arranged to correspond to the sealing member 24, to prevent the working medium from leaking through a clearance between the housing and the first valve plate.

Figure 3:
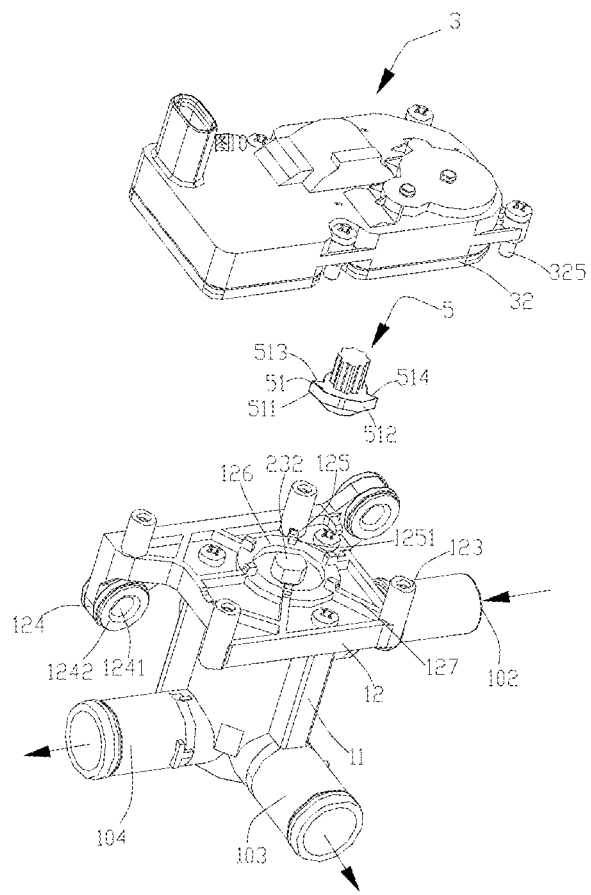
FIG. 3 is a perspective partially exploded view of the flow rate control device in FIG. 1, and schematically shows the relationship between the housing and a control component of the flow rate control device in assembling.
Figure 4:
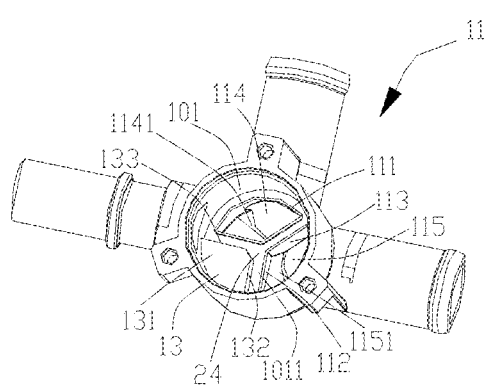
FIG. 4 is a schematic perspective view of a distribution main body of the flow rate control device in FIG. 2.
Figure 5:
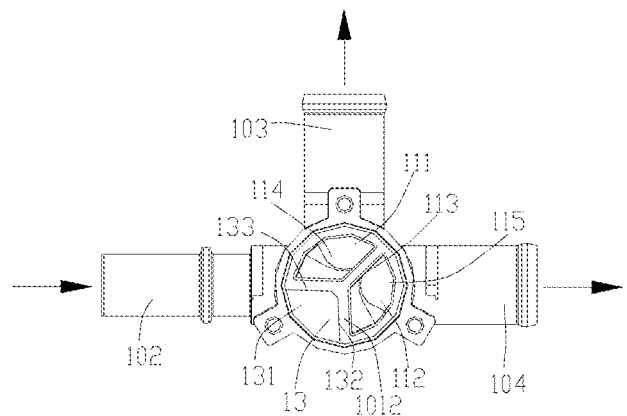
FIG. 5 is a schematic perspective top view of the distribution main body in FIG. 4.
Figure 11:
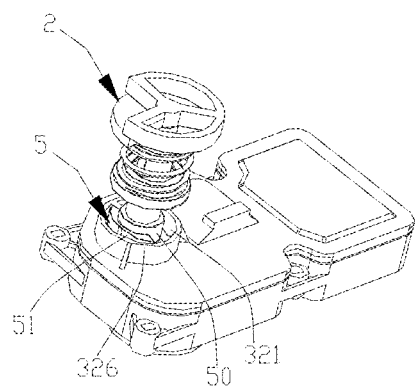
FIG. 11 is a schematic perspective view showing the valve body component in FIG. 6 assembled with the control component.
Figure 12:
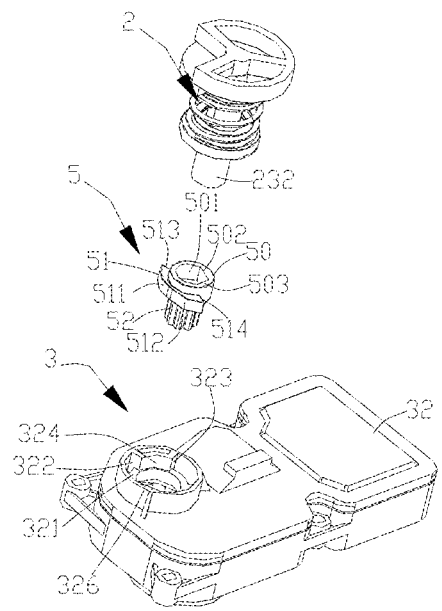
FIG. 12 is a schematic perspective view of the assembly in FIG. 11.
Figure 13:
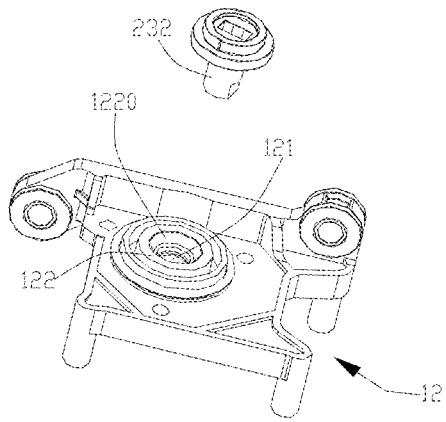
FIG. 13 is a schematic perspective view showing a cover body of the housing in FIG. 3 before being assembled with a transmission member.
Figure 14:
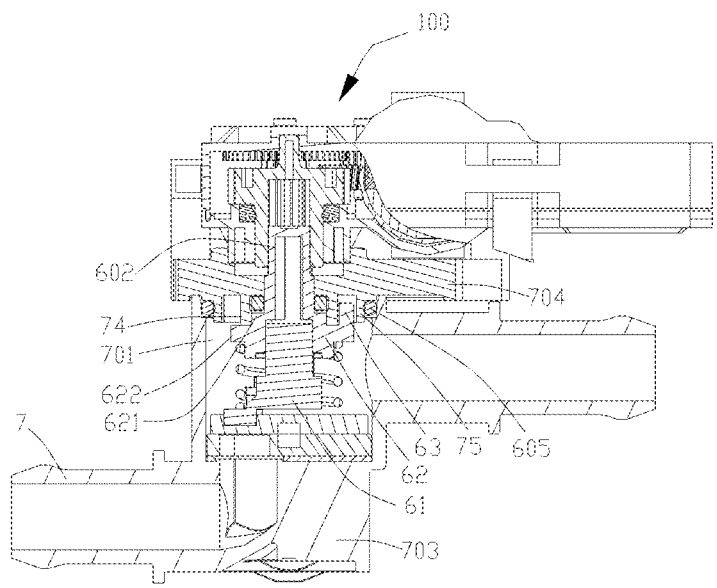
FIG. 14 is a schematic perspective view showing a flow rate control device according to a second embodiment in an assembled state.
Figure 15:
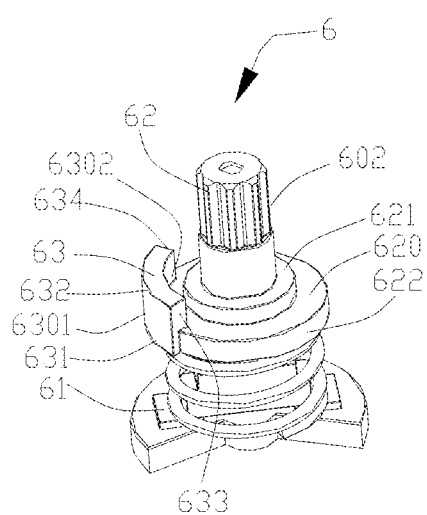
FIG. 15 is a schematic perspective view showing a valve body component of the flow rate control device in FIG. 14 in an assembled state.
Figure 16:
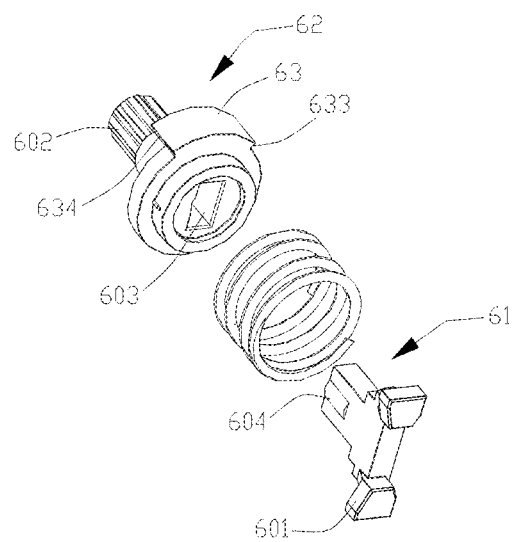
FIG. 16 is a schematic perspective exploded view of the valve body component in FIG. 15.
Figure 17:
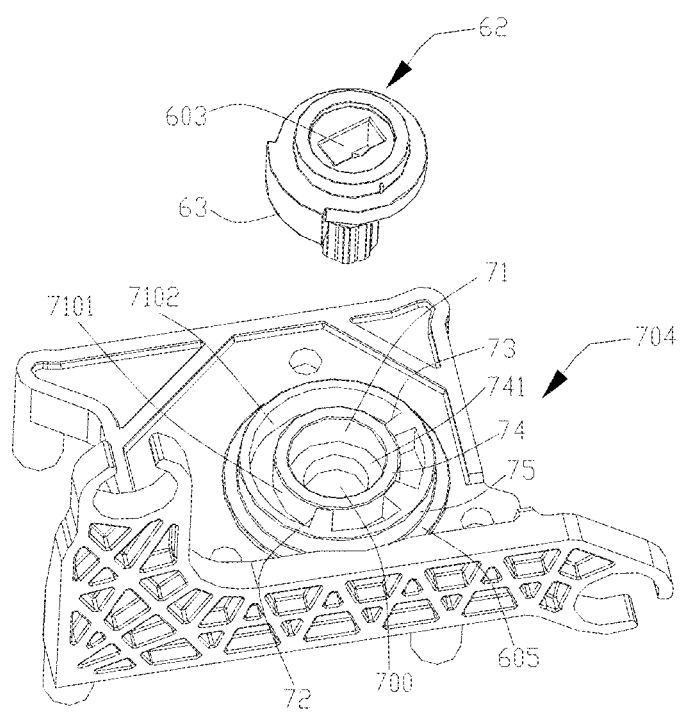
FIG. 17 is a schematic perspective view showing a cover body of a housing in FIG. 14 before being assembled with the transmission member.
Figure 18:
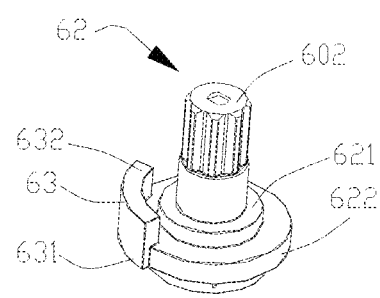
FIG. 18 is a schematic perspective view showing the transmission member of the valve body component in FIG. 15.

Referring to FIGS. 3, 7 and 8, one end of the transmission part 23 forms a first transmission portion 231, the first transmission portion is relatively fixed to the upper surface of the second valve plate 22, and the upper surface of the second valve plate 22 has a fixing recess 221 for accommodating the first transmission portion. Another end of the transmission part forms a second transmission portion 232, and the second transmission portion 232 is arranged to extend outwardly of the housing, that is, the first transmission portion 231 and the second transmission portion 232 are located at two opposite ends of the transmission part. Specifically, the cover body 12 of the housing 1 has a through hole 121 arranged to correspond to the second transmission portion 232. The second transmission portion passes through the through hole to extend outwards. Reference is further made to FIGS. 11 and 12, the flow rate control device further includes an adapter 5, and the adapter 5 is arranged outside of the housing. One end of the adapter is assembled with the second transmission portion 232 by concave and convex structures so as to be fixed relative to each other. Another end of the adapter is assembled with a transmission output portion 31 of the control component 3 by cooperated internal and external splines so as to be fixed relative to each other. By providing the adapter, the transmission part and the transmission output portion of the control part may be assembled to each other to be relatively fixed, and the controllability of the movement of the transmission part 23 can be improved. Specifically, the adapter 5 includes a main body portion 50, a position-limiting portion 51 and an adapter transmission portion 52. The main body portion 50 and the second transmission portion 232 are assembled relative to each other. The position-limiting portion 51 is arranged to overhang radially from the main body portion 50. The position-limiting portion 51 is arranged on a part of a circumferential side of the central axis of the main body portion, and the adapter transmission portion 52 is mechanically connected to the transmission output portion 31.

The control component 3 includes a position-limiting recess 321, a first stopper 322 and a second stopper 323. The position-limiting recess can correspondingly accommodate the position-limiting portion 51. Further, the position-limiting recess 321 is formed by extending outwards from a base 32 of a shell of the control component 3. The first stopper 322 and the second stopper 323 are integrally formed and located at an inner side of the position-limiting recess 321. A guiding side surface 324 is formed between the first stopper 322 and the second stopper 323 integrally. A circumferential side of the main body portion 50 of the adapter is relatively pivotally fitted with the guiding side surface 324. Specifically, an outer circumferential side of the main body portion may be in contact or not in contact with the guiding side surface. The position-limiting portion 51 has at least one guiding curved surface, specifically, the guiding curved surface may be a continuously extended arc-shaped curved surface or interconnected or separately arranged first guiding curved surface 511 and second guiding curved surface 512. The first guiding curved surface and the second guiding curved surface are each an arc-shaped curved surface, and the first guiding curved surface and the second guiding curved surface are relatively pivotally fitted with an inner wall of the position-limiting recess 321. In this embodiment, the position-limiting portion 51 includes a first stop fitting portion 513 and a second stop fitting portion 514, and the first stop fitting portion and the second stop fitting portion are integrally formed at two circumferentially arranged ends of the position-limiting portion. Specifically, the position-limiting portion 51 has a single convex block shape and extends from a circumferential side of the main body portion of the adapter 5, and the first stop fitting portion 513 and the second stop fitting portion 514 are two outer side surfaces of the position-limiting portion. Alternatively, the position-limiting portion 51 is a first convex block and a second convex block protruding from a circumferential side of the adapter 5, that is, the first convex block and the second convex block are arranged to have a spacing therebetween. Inner sides of the first convex block and the second convex block are arranged close to each other and facing towards each other, and outer sides of the first convex block and the second convex block are arranged away from each other and back to back. The first stop fitting portion is the outer side of the first convex block, and the second stop fitting portion is formed onto the outer side of the second convex block. The transmission output portion 31 includes at least two working positions. Specifically, the transmission output portion can achieve at least two working positions, that is, a first position and a second position. When the transmission output portion 31 is located in the first position, the first stop fitting portion 513 of the position-limiting portion 51 abuts against the first stopper 322. When the transmission output portion 31 rotates to the second position clockwise or counterclockwise, the second stop fitting portion 514 of the position-limiting portion 51 abuts against the second stopper 323. When the transmission output portion 31 is located in the first position or the second position, correspondingly, the transmission part 23 drives the second valve plate to open or close the flow valve port. The transmission output portion 31 moves between the first position and the second position, the first valve plate achieves a movement stroke from opening to closing relative to the second valve plate. The flow rate control device further includes a sealing ring 25, the sealing ring is arranged between a circumferential side of the second transmission portion 232 and an inner wall of the through hole 121 of the housing, to prevent leakage of the working medium from the through hole. Specifically, as the transmission output portion 31 of the control component drives the second transmission portion, driven by the second transmission portion 232, the first transmission portion 231 drives the second valve plate 22 to perform a rotating movement relative to the first valve plate 21. Driven by the first transmission portion 231, the second valve plate opens or closes at least one of the first flow port and the second flow port of the first valve plate. When the transmission output portion 31 is located in the first position, the first flow port 211 is opened to the maximum opening degree, and the opening degree of the second flow port 212 is zero. When the transmission output portion rotates to the second position, the opening degree of the first flow port 211 is zero, and the second flow port 212 is opened to the maximum opening degree.

One of the adapter 5 and the second transmission portion 232 has a positioning recess, and the other has a positioning fool-proofing portion. Specifically, the lower end of the main body portion of the adapter 5 is provided with a positioning recess 501. The second transmission portion 232 has the positioning fool-proofing portion 233. In the vertical direction of the transmission part 23, the positioning fool-proofing portion 233 is accommodated in the positioning recess 501, and the positioning fool-proofing portion 233 and the positioning recess 501 are fixed relative to each other, and the positioning recess and the positioning fool-proofing portion are formed with an erroneous fitting prevention structure capable of limiting position, and after being assembled, the erroneous fitting prevention structure can also prevent the positioning recess and the positioning fool-proofing portion from being twisted in the circumferential direction. The positioning recess 501 has at least one positioning flat surface 502, the positioning fool-proofing portion has at least one positioning flat surface 2331, and the positioning flat surface of the positioning recess abuts against the positioning flat surface of the positioning fool-proofing portion; and/or, the positioning recess has at least one positioning curved surface 503, and the positioning fool-proofing portion has at least one positioning curved surface 2332, and the positioning curved surface of the positioning recess abuts against the positioning curved surface of the positioning fool-proofing portion.

Referring to FIGS. 2, 3, 6, 8, 11 to 13, the transmission part 23 includes a connection member 234, a transmission member 235 and an elastic element 236. A lower end of the connection member is assembled to the second valve plate, and the connection member and the second valve plate are fixed relative to each other, and an upper end of the connection member is assembled to the transmission member, and the connection member and the transmission member are fixed relative to each other. A lower end of the transmission member has a fool-proofing recess, and the fool-proofing recess correspondingly accommodates and fixes the upper end of the connection member. The first transmission portion 231 is formed at a lower end part of the connection member, and the first transmission portion extends downwards to the second valve plate, and the second transmission portion 232 is formed at an upper end of the transmission member. The upper end of the transmission member extends outwards through the housing to thereby receiving the power output of the control component. Specifically, one of the connection member of the transmission part 23 and the second valve plate is provided with at least two fixing claws 2341, and the other is provided with fixing recesses respectively cooperated with the fixing protrusions, for example, the fixing recesses 221 of the second valve plate. The at least two fixing claws are arranged to be mirror symmetric. Driven by the fixing claws, the second valve plate 22 performs a circumferential rotating movement relative to the first valve plate 21. A lower side of the elastic element 236 is locked on a radial outer side of the fixing claws 2341, and an upper side of the elastic element abuts against a lower side of the transmission member. Further, a lower end of the elastic element 236 is locked onto a rib 2342 on the circumferential side of the connection member 234, and an upper end of the elastic element is locked onto a rib 2351 on the circumferential side of the transmission member 235, to allow the elastic element 236 to be fastened and locked onto a middle segment region of the main body of the transmission part 23, to increase the structural strength of the transmission part and also provide the transmission part 23 with an elastic buffer when the transmission part 23 is subjected to an excessive impact by an external force.

The transmission part 23 further includes a pivoting portion 237 and a connection portion 238. The pivoting portion is integrally formed with the second transmission portion 232, and an outer circumferential side of the pivoting portion 237 is pivotally fitted with the cover body 12 of the housing 1. The housing 1 is correspondingly provided with a convex pivotally fitting portion 122. The pivotally fitting portion is configured to protrude towards the pivoting portion from an inner side of the housing, and the pivotally fitting portion has a pivoting recess 1220 configured to accommodate the pivoting portion. The pivoting recess 1220 is in communication with the through hole 121. An inner circumferential side of the pivotally fitting portion 122 is pivotally fitted with the outer circumferential side of the pivoting portion 237, so that the pivotally fitting portion 122 and the pivoting portion 237 achieve circumferentially position limiting therebetween. The transmission part rotates between a first position and a second position relative to the housing. Driven by the transmission part 23, the pivoting portion 237 rotates reciprocally clockwise or counterclockwise relative to the housing. Specifically, the pivoting portion 237 is rotated clockwise or counterclockwise from the first position to the second position, thereby being able to control the movement position of the valve core assembly and improve the motion control performance of the transmission part. The pivotally fitting portion 122 is integrally formed on one side of the housing and protrudes toward the side where the mounting chamber is located, and has a relatively simple structure. The pivoting portion is configured in a cylindrical shape, and the connection portion 238 is configured in a column shape. The connection portion 238 and the pivoting portion 237 are integrally formed into a step shape. The pivotally fitting portion and the connection portion abut against each other in the vertical direction and achieves axially position limiting therebetween, which, combined with the above circumferentially position limiting, can further enhance the coaxiality of the transmission part and prevent the transmission part from being skewed. The pivotally fitting portion includes a first position-limiting region and a second position-limiting region arranged to intersect with each other. The first position-limiting region abuts against an outer side surface of the pivoting portion. Specifically, an inner circumferential side surface of the pivotally fitting portion forms the first position-limiting region, and a top surface of the pivotally fitting portion forms the second position-limiting region, and the second position-limiting region abuts against a top surface of the connection portion. With the circumferential position-limiting between the first position-limiting region and the pivoting portion and the axial position-limiting between the second position-limiting region and the connection portion, the circumferential position-limiting and the axial position-limiting of the valve core assembly can be achieved, and skewing of the valve core assembly in the axial vertical direction can be reduced, and the coaxiality of the valve core assembly can be improved. Moreover, on a plane perpendicular to the vertical direction, the second position-limiting region has a radial width smaller than that of the connection portion, to further reduce the movement friction resistance therebetween.

The casing of the control component and the housing 1 are assembled and fixed relative to each other. Specifically, the cover body 12 of the housing may be correspondingly assembled to the control component. The housing and the casing of the control component can be fixed to each other by threaded connection or riveting. The housing includes a fixation portion 123, and the casing of the control component has a fixation fitting portion 325 assembled with the fixation portion. The fixation portion and the fixation fitting portion are fixed to each other by threaded connection or riveting, and the fixation portion serves as a threadedly fixing region or a rivetingly fixing region. Specifically, the control component 3 and the cover body 12 are assembled with each other by threaded connection, welding or riveting. The housing 1 is integrally formed with an external fixation frame 124, for being assembled to other external equipment. The external fixation frame includes a fixation hole 1241 and a shockproof ring 1242 locked inside the fixation hole, to reduce the adverse effect of environmental shocks on the flow rate control device.

The housing 1 is provided with a first protrusion 125 on an outer side thereof. Specifically, the first protrusion is arranged on an outer side of the cover body 12 so as to be assembled with the casing of the control component. The casing of the control component is provided with a second protrusion 326. The first protrusion and the second protrusion are assembled and fitted with each other, can assist the housing and the casing of the control component in pre-positioning relative to each other so as to be assembled conveniently, and can improve the assembly accuracy of the housing with the casing of the control component, prevent the housing and the casing of the control component from deviating from each other too much and generating a shear stress to the valve core assembly accordingly, thereby can improve the coaxiality of the valve core assembly and improve the motion control performance of the transmission part. The first valve plate and the second valve plate are better fitted against each other to avoid causing leakage between the two valve plates, improve the coaxiality between the transmission part and the transmission output portion, and the coaxiality of the valve core assembly itself, and reduce the shear stress between the connection parts caused by poor coaxiality. The first protrusion 125 and the second protrusion 326 may have an interference fit or a transition fit therebetween, and with such an arrangement, the first protrusion and the second protrusion are most closely fitted, and the possibility of shaking is minimized. Or, the first protrusion and the second protrusion have a clearance fit therebetween, and in this way, the assembly relative to each other is relatively easy, and the assembly accuracy can be ensured by controlling the size of the clearance. The second protrusion 326 is nested in an inner circumferential side of the first protrusion 125, and the first protrusion 125 has a block structure capable of abutting against an outer circumferential side of the second protrusion. The first protrusion 125 is relatively arranged at an outer circumferential side of the second transmission portion 232, and a clearance between the inner circumferential side of the first protrusion and the outer circumferential side of the second transmission portion is larger than the thickness of a side wall of the second protrusion, so that the second protrusion 326 can be nested to the inner circumferential side of the first protrusion 125 conveniently. With the first protrusion and the second protrusion assembled and fitted with each other, the first protrusion can limit the position of the outer circumferential side of the second protrusion circumferentially, which can improve the coaxiality of the valve core assembly after the housing 1 is assembled with the casing of the control component. In this embodiment, the first protrusion 125 is at least three convex block-shaped structures protruding from the outer side of the housing, of course, in other embodiments, the first protrusion may also be at least two plate-shaped curved structures, and the second protrusion is an annular column, of course, the second protrusion may also be at least two plate-shaped curved structures. The second protrusion may be arranged to just corresponding to the first protrusion, and the second protrusion has a circumferential width larger than that of the first protrusion, thereby ensuring that a stable position limiting can be achieved between the first protrusion and the second protrusion. An inner side surface of the first protrusion of the convex block-shaped structure or the plate shaped curved structure is provided with a concaved arc-shaped surface 1251, and the arc-shaped surface serves as the aforementioned block structure for abutting against the outer circumferential side of the second protrusion. The arc-shaped surface faces towards the outer circumferential side of the second protrusion, and a clearance is presented between the arc-shaped surface and the outer circumferential side of the second protrusion 326. For example, the clearance between the inner circumferential side of the first protrusion and the outer circumferential side of the second protrusion ranges from 0 mm to 0.15 mm, that is, the clearance between the inner circumferential side of the first protrusion and the outer circumferential side of the second protrusion may further range from 0.025 mm to 0.125 mm. Thus, by controlling the size of the clearance, not only the assembly accuracy can be ensured, but also a deviation between the housing and the casing of the control component can be prevented and the reduced coaxiality of the valve core assembly caused accordingly can be prevented. With the first protrusion and the second protrusion being assembled and fitted with each other, the adverse effects caused by accumulated errors of the assembled parts can be reduced. Specifically, the shear forces subjected by the moving components inside the control component and the valve body when being connected can be reduced, and the shear stress caused after the housing and the casing of the control component are connected by a screw element 4 can be reduced, thereby may protect the moving parts of the valve core assembly of the flow rate control device, for example, the connection member, the transmission member, the adapter, the first valve plate and the second valve plate.

The housing is further provided with a boss 126 on an outer side thereof, and the first protrusions 125 are integrally formed with the boss 126. Specifically, the first protrusions 125 are configured to protrude upwards from the boss 126. When the housing is assembled with the casing of the control component, the structures of the first protrusion 125 are arranged in a mirror-symmetric manner or center-symmetric manner at the outer circumferential side of the second protrusion 326, and in the vertical direction, a top surface of the boss 126 and a top end of the second protrusion 326 are arranged to face towards each other and have a clearance therebetween, and the clearance ranges from 0 mm to 3.5 mm. With such an arrangement, the housing and the casing of the control component may be more easily aligned with each other and positioned when to assemble, and thus, the swaying caused by a poor coplanarity of the housing and the casing of the control component is prevented.

The outer side of the housing includes multiple ribs 127, and one end of each of the ribs extends to an outer circumferential side of the boss 126, to improve the structural strength of the housing while reducing the thickness of the housing as much as possible. The rib 127 has one end integrally formed with the boss 126 and has another end integrally forming the fixation portion 123 of the housing. The first protrusion 125 is configured to protrude upwards from the top surface of the boss 126, and the structure has a simpler design and a high strength. When viewed from the vertical direction, an inner circumferential side of the boss 126 has a diameter smaller than the diameter of the inner circumferential side of the first protrusion, or the boss 126 extends radially inwards and towards the through hole 121, that is, the boss 126 is arranged closer to the through hole 121 than the first protrusion 125 is.

Of course, reference may also be made to FIGS. 14 to 18. In another embodiment, the adapter may not be provided. The following mainly describes differences of this embodiment from the preceding embodiment. In this embodiment, the transmission part 6 includes a first transmission portion 601 and a second transmission portion 602, and the first transmission portion 601 and the second transmission portion 602 are located at two opposite ends of the transmission part. Specifically, another end of the transmission part 6, such as the second transmission portion 602, is fitted and assembled with the transmission output portion of the control component by internal and external splines, so as to be relatively fixed. The transmission part 6 includes a connection member 61 and a transmission member 62. The first transmission portion 601 is integrally formed at a lower end portion of the connection member, and an upper end of the transmission member 62 extends out of a housing. The second transmission portion 602 is integrally formed on the upper end of the transmission member. The housing 7 has a through hole 700 for the second transmission portion to pass through and extend outwards from the housing. The transmission part 6 further includes a position-limiting portion 63 located in a mounting chamber 701 of the housing 7. The housing 7 is formed with a position-limiting recess 71, a first block portion 72 and a second block portion 73, and the position-limiting portion 63 is at least partially located in the position-limiting recess 71. Driven by the transmission output portion, the transmission part 6 reciprocally rotates relative to the housing between the first position and the second position. When the transmission part is located in the first position, the position-limiting portion 63 abuts against the first block portion 72, and when the transmission part rotates to the second position, the position-limiting portion 63 abuts against the second block portion 73, thereby, the transmission part can be accurately limited between the first position and the second position. The second transmission portion and the position-limiting portion may be separately configured and assembled and connected to each other. Of course, the second transmission portion 602 and the position-limiting portion 63 may also be integrally formed as in this embodiment. With the transmission part having the integrally formed position-limiting portion 63 and second transmission portion 602, the position-limiting portion reaching the liming position can be accurately transmitted to the second transmission portion, and further transmitted to the transmission system, thereby may improve the motion accuracy of the position-limiting portion 63. Compared with the structure in which the position-limiting portion and the second transmission portion are arranged separately, this arrangement can limit the position timely, avoid a low adjustment performance of the valve port caused by delayed position limiting. Since the position-limiting portion 63 is arranged in the housing, and the second transmission portion 602 is arranged outside of the housing, the position-limiting portion 63 is separated from the second transmission portion 602 by the housing, thereby the impact subjected by the position-limiting portion during the transmission may be eliminated, and the excessive impact caused to the gear transmission system due to instant pause in the process of position limiting may be relatively reduced.

One of the transmission member 62 and the connection member 61 has a positioning recess 603, and the other has a positioning fool-proofing portion 604. In this embodiment, the transmission member 62 has the positioning recess 603, and the connection member 61 has the positioning fool-proofing portion 604. It may also be embodied as that the connection member 61 is provided with the positioning recess and the transmission member 62 is provided with the positioning fool-proofing portion. In the vertical direction, the positioning fool-proofing portion 604 and the positioning recess 603 are assembled and relatively fixed to each other, and the positioning recess and the positioning fool-proofing portion are formed with erroneous fitting prevention structures which can be positioned by each other.

The transmission member 62 has a main body portion 620, and the main body portion and an upper end of the connection member 61 are assembled and relatively fixed to each other. The second transmission portion 602 protrudes upwards from the main body portion 620 and extends out of the housing 7. The position-limiting portion 63 is integrally formed on part of a circumferential side of the main body portion 620. Specifically, the position-limiting portion 63 is arranged on part of the periphery of the main body portion about the center axis of the main body portion, and the position-limiting portion protrudes upwards from the main body portion into the position-limiting recess 71. The transmission output portion 702 of the control component can provide a driving force for the transmission part. The second transmission portion 602 is mechanically connected to the transmission output portion 702, and thus power transmission can be achieved smoothly.

Further, the main body portion 620 of the transmission member includes a pivoting portion 621 and a connection portion 622. The pivoting portion 621 is pivotally fitted with the housing 7, and the housing 7 has a pivotally fitting portion 74 arranged corresponding to the pivoting portion. The pivotally fitting portion has a pivoting recess 741 for accommodating the pivoting portion, and the pivoting recess is in communication with the through hole 700. An outer side of the pivoting portion 621 is pivotally fitted with an inner side of the pivotally fitting portion 74. The connection portion 622 is integrally formed with the pivoting portion 621 to be configured in a step shape. Specifically, the pivoting portion 621 is configured in a cylindrical shape, and the connection portion 622 is configured in a column shape, and the pivoting portion has an outer perimeter smaller than an outer perimeter of the connection portion. The position-limiting portion 63 is integrally formed with a part of circumferential side of the connection portion 622. The flow rate control device further includes a sealing member 605, and the housing is integrally formed with an engagement protrusion 75, and the sealing member 605 is locked to an outer circumferential side of the engagement protrusion 75, to thereby sealing the housing, and preventing the fluid medium from leaking outwards.

The position-limiting portion 63 includes a first extension portion 631 and/or a second extension portion 632. The first extension portion 631 protrudes radially outward along the connection portion 622, and the second extension portion 632 protrudes from the connection portion and/or the first extension portion towards the direction of the position-limiting recess, for example, convexly protruding toward the vertical direction or protruding upwards in a direction at a slight angle with respect to the vertical direction. At least one of the first extension portion 631 and the second extension portion 632 is fitted with the position-limiting recess, by which the position of the transmission part may just be limited. The engagement protrusion 75 is located on an outer circumferential side of the position-limiting portion. The engagement protrusion and the pivotally fitting portion protrude toward the same side. If necessary, for example, when a clearance between the engagement protrusion and the position-limiting portion is small, an inner circumferential side of the engagement protrusion can limit the position of the outer circumferential side of the position-limiting portion, to prevent the position-limiting portion from shifting. The position-limiting portion 63 according to this embodiment includes a first stop fitting portion 633 and a second stop fitting portion 634 integrally formed at circumferentially arranged two ends of the position-limiting portion. Specifically, the position-limiting portion 63 extends in a single convex block shape from the circumferential side of the transmission member, and the first stop fitting portion 633 and the second stop fitting portion 634 are two outer side surfaces of the position-limiting portion. Alternatively, the position-limiting portion 63 is a first convex block and a second convex block protruding from a circumferential side of the transmission member, that is, the first convex block and the second convex block are arranged to have a spacing thererbetween. Inner sides of the first convex block and the second convex block are arranged close to each other and facing towards each other, and outer sides of the first convex block and the second convex block are arranged away from each other and back to back. The first stop fitting portion is an outer side of the first convex block, and the second stop fitting portion is formed on an outer side of the second convex block. When the transmission part is located in the first position, the first stop fitting portion 633 abuts against the first block portion. When the transmission part rotates to the second position clockwise or counterclockwise, the second stop cooperating portion abuts against the second block portion. When the transmission output portion 702 drives the transmission part 6 to be located in the first position or the second position, correspondingly, the transmission part 23 drives the second valve plate to open or close the flow valve port. The transmission output portion 31 moves between the first position and the second position, and the first valve plate achieves a movement stroke from opening to closing relative to the second valve plate.

In this embodiment, the housing 7 includes a distribution main body 703 and a cover body 704. The distribution main body is formed with the mounting chamber, and the second transmission portion 602 extends outwards from the cover body. The pivotally fitting portion 74 is integrally formed on one side of the cover body and protrudes toward the mounting chamber in the vertical direction. The first block portion 72 is integrally formed with the outer circumferential side of the pivotally fitting portion 74, and the second block portion 73 is also integrally formed with the outer circumferential side of the pivotally fitting portion 74. The position-limiting recess 71 is formed on the outer circumferential side of the pivotally fitting portion, and the position-limiting recess extends to be formed at a region between the first block portion and the second block portion. A first curved surface 6301 and/or a second curved surface 6302 are respectively formed on inner and outer sides of the position-limiting portion 63. A first position-limiting surface 7101 and a second position-limiting surface 7102 are respectively formed on two sides of the position-limiting recess 71. The first block portion 72 is arranged to intersect with the first position-limiting surface and the second position-limiting surface, and the second block portion 73 is arranged to intersect with the first position-limiting surface and the second position-limiting surface. The first curved surface 6301 and the second curved surface 6302 are arranged facing the first position-limiting surface 7101 and the second position-limiting surface 7102 of the position-limiting recess 71, respectively.

It should be noted that the above embodiments are only intended to illustrate the present application rather than limiting the technical solutions described in the present application. Although the present application has been described in detail with reference to the above-mentioned embodiments, the person skilled in the art should understand that those skilled in the art can still modify or equivalently substitute the present application, and all the technical solutions and improvements that do not depart from the spirit and scope of the present application should be covered by the scope of the claims of the present application.

What is claimed is:

1. A flow rate control device, comprising:
    a housing,
    a valve core assembly, and
    a control component,
    wherein the housing has a mounting chamber, and the valve core assembly is at least partially accommodated in the mounting chamber, the valve core assembly comprises a first valve plate, a second valve plate and a transmission part, the housing has a position-limiting protrusion and an accommodating portion at a bottom side of the mounting chamber, the first valve plate is at least partially located at the accommodating portion, the position-limiting protrusion limits the position of the first valve plate in a circumferential direction, a lower surface of the second valve plate is arranged at least partially opposite to the position-limiting protrusion, and the lower surface of the second valve plate is in surface contact with an upper surface of the first valve plate in a sealed manner;
    the housing has at least one flow hole at the bottom side of the mounting chamber, the first valve plate has at least one flow valve port corresponding to and in communication with the flow hole, the second valve plate is relatively fixedly connected to the transmission part, and driven by the transmission part, the second valve plate opens or closes the flow valve port of the first valve plate and/or regulates an opening degree of the flow valve port; the transmission part comprises a first transmission portion and a second transmission portion, and in a vertical direction perpendicular to the first valve plate, the first transmission portion and the second transmission portion are located at two opposite ends of the transmission part, the first transmission portion is assembled with an upper side of the second valve plate, and the housing has a through hole corresponding to the second transmission portion, the second transmission portion passes through the through hole and extends out of the housing; a first protrusion is provided on outer side of the housing, and a second protrusion is provided on a casing of the control component, and the first protrusion and the second protrusion are assembled and fitted with each other; and
    the transmission part comprises a connection member and a transmission member, and the transmission member comprises a position-limiting portion, and the position-limiting portion is located in the mounting chamber, the housing comprises a position-limiting recess, a first block portion and a second block portion, and the position-limiting portion is correspondingly located in the position-limiting recess, and driven by a transmission output portion of the control component, the transmission part rotates relative to the housing between a first position and a second position, and when the transmission part is located in the first position, the position-limiting portion abuts against the first block portion, and when the transmission part rotates to the second position, the position-limiting portion abuts against the second block portion, a circumferential part of the first protrusion is located at an outer circumferential side of the first block portion and the second block portion, and an inner circumferential side of another circumferential part of the first protrusion surrounds to form the position-limiting recess.

2. The flow rate control device according to claim 1, wherein the casing of the control component and the housing are assembled and relatively fixed to each other, an interference fit or a clearance fit is present between the first protrusion and the second protrusion, the second protrusion is nested and connected to an inner circumferential side of the first protrusion, and the first protrusion has a block structure for abutting against an outer circumferential side of the second protrusion; the first transmission portion is formed at a lower end part of the connection member, and the first transmission portion extends downwards to the second valve plate, and the second transmission portion is formed at an upper end part of the transmission member, and the second transmission portion extends upward through the through hole, the first protrusion is arranged at an outer circumferential side of the second transmission portion, and a clearance between the inner circumferential side of the first protrusion and the outer circumferential side of the second transmission portion is larger than the thickness of a side wall of the second protrusion.

3. The flow rate control device according to claim 2, wherein a clearance between the inner circumferential side of the first protrusion and the outer circumferential side of the second protrusion ranges from 0 mm to 0.15 mm, the first protrusion is at least three convex block-shaped structures protruding from the outer side of the housing or at least two plate-shaped curved structures, an inner side surface of the convex block-shaped structure or the plate-shaped curved structure is provided with an arc-shaped surface, the arc-shaped surface faces towards the outer circumferential side of the second protrusion, and a clearance is presented between the arc-shaped surface and the outer circumferential side of the second protrusion, and the second protrusion is an annular column or at least two plate-shaped curved structures, and the second protrusion has a circumferential width larger than a circumferential width of the first protrusion.

4. The flow rate control device according to claim 3, wherein the clearance between the inner circumferential side of the first protrusion and the outer circumferential side of the second protrusion ranges from 0.025 mm to 0.125 mm, the housing comprises a fixation portion, and the fixation portion is integrally connected with another end of a rib, the casing of the control component has a fixation fitting portion assembled with the fixation portion, and the fixation portion and the fixation fitting portion are fixed to each other by threaded connection or riveting; a boss is further provided with on an outer side of the housing, and the first protrusion is integrally connected with the boss, the first protrusion is configured to protrude upwards from the boss, and when the housing is assembled with the casing of the control component, the structures of first protrusion are arranged in a mirror-symmetric manner or center-symmetric manner at the outer circumferential side of the second protrusion.

5. The flow rate control device according to claim 4, wherein in the vertical direction, a top surface of the boss and a top end of the second protrusion are arranged to face towards each other and a clearance is present between the top surface of the boss and the top end of the second protrusion, and the clearance ranges from 0 mm to 3.5 mm, the outer side of the housing comprises a plurality of ribs, and one end of each of the ribs extends to an outer circumferential side of the boss, the rib has one end integrally connected with the boss, the first protrusion is configured to protrude upwards from the top surface of the boss; and when being viewed from the vertical direction, an inner circumferential side of the boss has a diameter smaller than the diameter of the inner circumferential side of the first protrusion, or the boss extends radially inwards and towards the through hole.

6. The flow rate control device according to claim 1, wherein the connection member is assembled with the transmission member, and the first transmission portion is formed at a lower end of the connection member, and an upper end of the transmission member extends out of the housing, the second transmission portion is integrally arranged at the upper end of the transmission member, the transmission member comprises the position-limiting portion and the second transmission portion, and the transmission member further comprises a main body portion, the main body portion is assembled and fixed to an upper end of the connection member, and the second transmission portion protrudes upwards from the main body portion and extends out of the housing, the position-limiting portion protrudes at part of a circumferential side of main body portion in a radial direction of the main body portion, and the position-limiting portion protrudes upwards from the main body portion into the position-limiting recess, the transmission output portion is configured for providing a drive force to the transmission member, and the second transmission portion is mechanically connected to the transmission output portion.

7. The flow rate control device according to claim 1, wherein the transmission member further comprises a main body portion, the main body portion of the transmission member comprises a pivoting portion and a connection portion, and the pivoting portion is pivotally fitted with the housing, the housing has a pivotally fitting portion, and the pivotally fitting portion is arranged to correspond to the pivoting portion, the pivotally fitting portion has a pivoting recess accommodating the pivoting portion, and the pivoting recess is in communication with the through hole, and the connection portion and the pivoting portion are integrally connected to form a step-shaped arrangement, and the position-limiting portion is integrally connected to part of a circumferential side of the connection portion.

8. A flow rate control device, comprising:
a housing, a valve core assembly and a control component, wherein the housing has a mounting chamber, and the valve core assembly is at least partially accommodated in the mounting chamber, the valve core assembly comprises a first valve plate, a second valve plate and a transmission part, the housing has a position-limiting protrusion and an accommodating portion at a bottom side of the mounting chamber, the first valve plate is at least partially located at the accommodating portion, the position-limiting protrusion is configured to limit the position of the first valve plate in a circumferential direction, a lower surface of the second valve plate is arranged at least partially opposite to the position-limiting protrusion, and the lower surface of the second valve plate is in surface contact with an upper surface of the first valve plate in a sealed manner; and
the housing has at least one flow hole at the bottom side of the mounting chamber, the first valve plate has at least one flow valve port corresponding to and in communication with the flow hole, the second valve plate is relatively fixedly connected to the transmission part, and driven by the transmission part, the second valve plate opens or closes the flow valve port of the first valve plate and/or regulates an opening degree of the flow valve port; the transmission part comprises a first transmission portion and a second transmission portion, and in a vertical direction perpendicular to the first valve plate, the first transmission portion and the second transmission portion are located at two opposite ends of the transmission part, the first transmission portion is assembled and fixed to an upper side of the second valve plate, and the housing has a through hole corresponding to the second transmission portion, and the second transmission portion passes through the through hole and extends out of the housing; a first protrusion is provided on outer side of the housing, and a second protrusion is provided on a casing of the control component, and the first protrusion and the second protrusion are assembled and fitted with each other;
the transmission part further comprises a pivoting portion, and the pivoting portion is integrally formed with the second transmission portion, the pivoting portion is pivotally fitted with the housing, and the housing is correspondingly convexly provided with a pivotally fitting portion, the pivotally fitting portion is configured to protrude from an inner side of the housing towards a side where the pivoting portion is located, and the pivotally fitting portion has a pivoting recess for accommodating the pivoting portion, the pivoting recess is in communication with the through hole, and an inner circumferential side of the pivotally fitting portion is pivotally fitted with an outer circumferential side of the pivoting portion; and
the transmission part comprises a connection member and a transmission member, and the transmission member comprises a position-limiting portion, and the position-limiting portion is located in the mounting chamber, the housing comprises a position-limiting recess, a first block portion and a second block portion, and the position-limiting portion is correspondingly located in the position-limiting recess, and driven by a transmission output portion of the control component, the transmission part rotates relative to the housing between a first position and a second position, and when the transmission part is located in the first position, the position-limiting portion abuts against the first block portion, and when the transmission part rotates to the second position, the position-limiting portion abuts against the second block portion, a circumferential part of the first protrusion is located at an outer circumferential side of the first block portion and the second block portion, and an inner circumferential side of another circumferential part of the first protrusion surrounds to form the position-limiting recess.

9. The flow rate control device according to claim 8, wherein the transmission part further comprises a connection portion, and the connection portion and the pivoting portion are integrally formed into a step-shaped arrangement, and a top side of the pivotally fitting portion and the connection portion are oppositely arranged to abut against each other in the vertical direction.

10. The flow rate control device according to claim 9, wherein the pivotally fitting portion comprises a first position-limiting region and a second position-limiting region arranged to intersect with each other, wherein the first position-limiting region is pivotally fitted with an outer side surface of the pivoting portion, the inner circumferential side of the pivotally fitting portion forms the first position-limiting region, and a top side of the pivotally fitting portion forms the second position-limiting region, and the second position-limiting region abuts against a top surface of the connection portion, and on a plane perpendicular to the vertical direction, the second position-limiting region has a radial width smaller than a radial width of the connection portion.

11. The flow rate control device according to claim 8, wherein the pivoting portion is in a cylindrical shape, the transmission part rotates relative to the housing between a first position and a second position, and driven by the transmission part, the pivoting portion is rotatable reciprocally clockwise or counterclockwise relative to the housing, the pivotally fitting portion is integrally formed on the inner side of the housing and protrudes towards a side where the mounting chamber is located.

12. The flow rate control device according to claim 11, wherein the transmission part further comprises a connection portion, and the connection portion and the pivoting portion are integrally formed into a step-shaped arrangement, and the pivotally fitting portion and the connection portion abut against each other in the vertical direction, the connection portion is configured in a column shape, and the pivoting portion has an outer perimeter smaller than the outer perimeter of the connection portion.

13. The flow rate control device according to claim 9, wherein the first block portion and the second block portion are integrally formed on an outer circumferential side of the pivotally fitting portion, and the position-limiting recess is formed on the outer circumferential side of the pivotally fitting portion and extends in a region between the first block portion and the second block portion; the position-limiting portion comprises a radially extending portion and/or a vertically protruding portion, the radially extending portion protrudes radially outwards along the connection portion, and the vertically protruding portion is configured to protrude in the vertical direction from the connection portion and/or the radially extending portion, the housing is integrally formed with an engagement protrusion, and the engagement protrusion is located on an outer circumferential side of the position-limiting portion, and is configured to limit the position-limiting portion to move reciprocally in the position-limiting recess.

14. The flow rate control device according to claim 9, wherein the connection member is assembled with the transmission member, and the first transmission portion is formed at a lower end of the connection member, the first transmission portion and the second valve plate are assembled and fixed to each other, and an upper end of the transmission member extends out of the housing, the second transmission portion is integrally arranged at the upper end of the transmission member, the second transmission portion and the position-limiting portion are integrally formed, or the second transmission portion and the position-limiting portion are separately arranged and are assembled and connected to each other.

15. The flow rate control device according to claim 8, wherein the transmission member is integrally formed with the position-limiting portion and the second transmission portion, and the transmission member has a main body portion, the main body portion is assembled and fixed to an upper end of the connection member, and the second transmission portion protrudes upwards from the main body portion and extends out of the housing, the position-limiting portion protrudes at part of a circumferential side of main body portion in a radial direction of the main body portion, and the position-limiting portion protrudes upwards from the main body portion into the position-limiting recess, the transmission output portion of the control component is configured to provide a drive force to the transmission part, and the second transmission portion is mechanically connected to the transmission output portion.

* * * * *